US005609361A

United States Patent [19]
Bergerson et al.

[11] Patent Number: 5,609,361
[45] Date of Patent: Mar. 11, 1997

[54] INFLATION FLUID CONTAINER AND INITIATOR WITH PRESS-FIT FLUID SEAL

[75] Inventors: Lee D. Bergerson, Fountain Valley; Ivan L. Stonich, Hermosa Beach, both of Calif.

[73] Assignee: TRW Vehicle Safety Systems Inc., Lyndhurst, Ohio

[21] Appl. No.: 518,825

[22] Filed: Aug. 24, 1995

[51] Int. Cl.$^6$ .................................................. B60R 21/16
[52] U.S. Cl. ........................................ 280/741; 280/737
[58] Field of Search ................................ 280/737, 740, 280/741, 736, 742; 102/202.5, 205

[56] References Cited

U.S. PATENT DOCUMENTS

| 3,173,992 | 3/1965 | Boop . | |
|---|---|---|---|
| 3,528,372 | 9/1970 | Lewis et al. . | |
| 3,588,142 | 6/1971 | Gorman | 280/736 |
| 3,930,666 | 1/1976 | Lynch et al. | 280/737 |
| 5,060,973 | 10/1991 | Giovanetti | 280/741 |
| 5,104,466 | 4/1992 | Allard et al. . | |
| 5,152,550 | 10/1992 | Hoagland et al. | 280/737 |
| 5,243,492 | 9/1993 | Marquit et al. . | |
| 5,290,060 | 3/1994 | Smith | 280/737 |
| 5,345,875 | 9/1994 | Anderson . | |
| 5,348,344 | 9/1994 | Blumenthal et al. . | |
| 5,531,473 | 7/1996 | Rink et al. | 280/737 |

FOREIGN PATENT DOCUMENTS

| 602862 | 6/1994 | European Pat. Off. | 280/736 |
|---|---|---|---|
| 811159 | 4/1959 | United Kingdom | 102/202.5 |

Primary Examiner—Eric D. Culbreth
Attorney, Agent, or Firm—Tarolli, Sundheim, Covell, Tummino & Szabo

[57] ABSTRACT

An air bag inflator (22) includes a container (40) and an initiator (42). The container (40) defines a storage chamber (50) containing inflation fluid at an elevated pressure. A container wall (46) has a frusto-conical surface (154) defining a passage (156) extending outward from the storage chamber (50) through the container wall (46). The initiator (42) extends into the storage chamber (50) through the passage (156) in the container wall (46), and has a frusto-conical peripheral surface (88). The frusto-conical surfaces (88,154) are pressed tightly against each other in sealing contact so as to block the inflation fluid from leaking outward through the passage in the container wall (46).

13 Claims, 3 Drawing Sheets

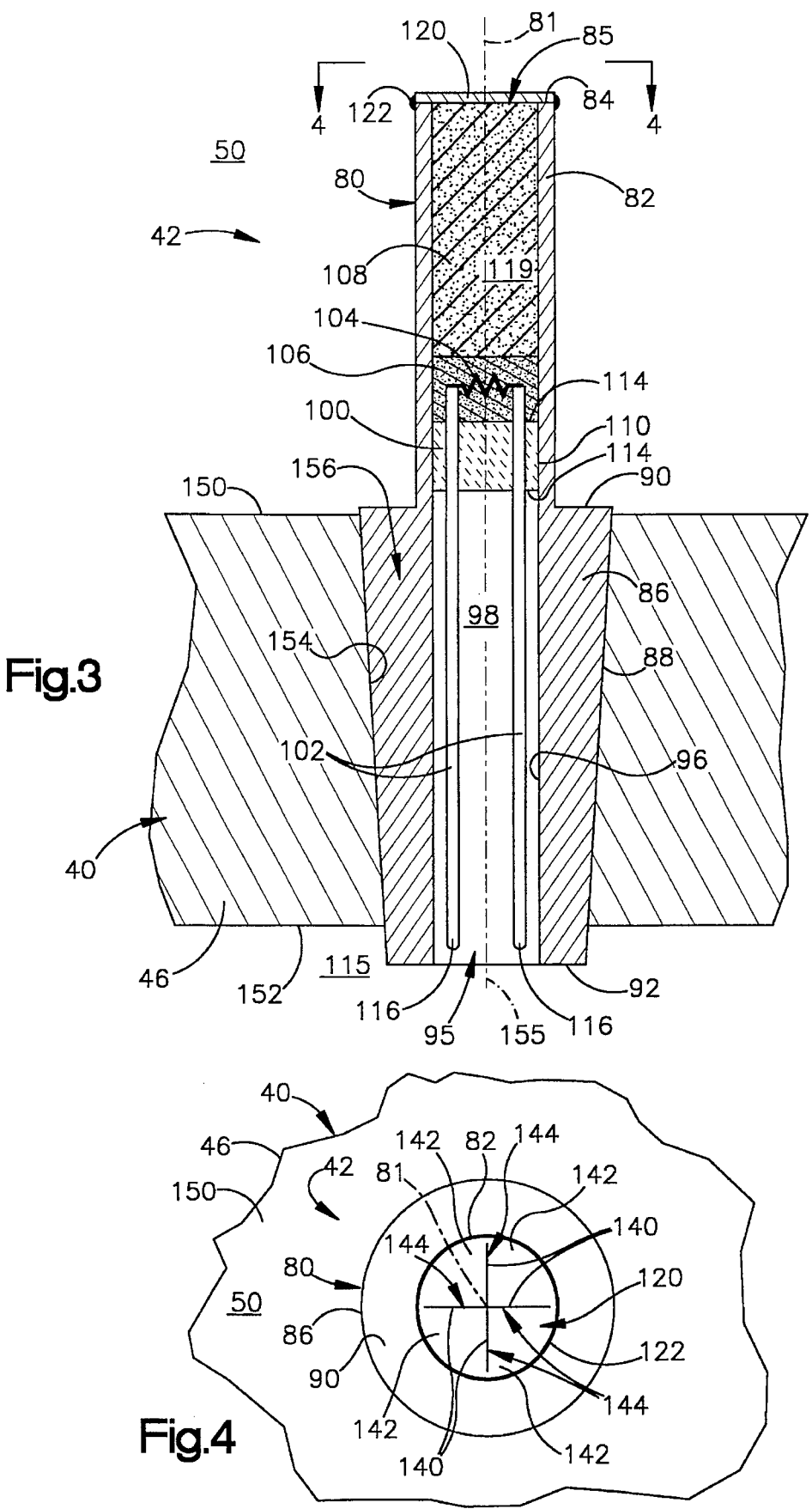

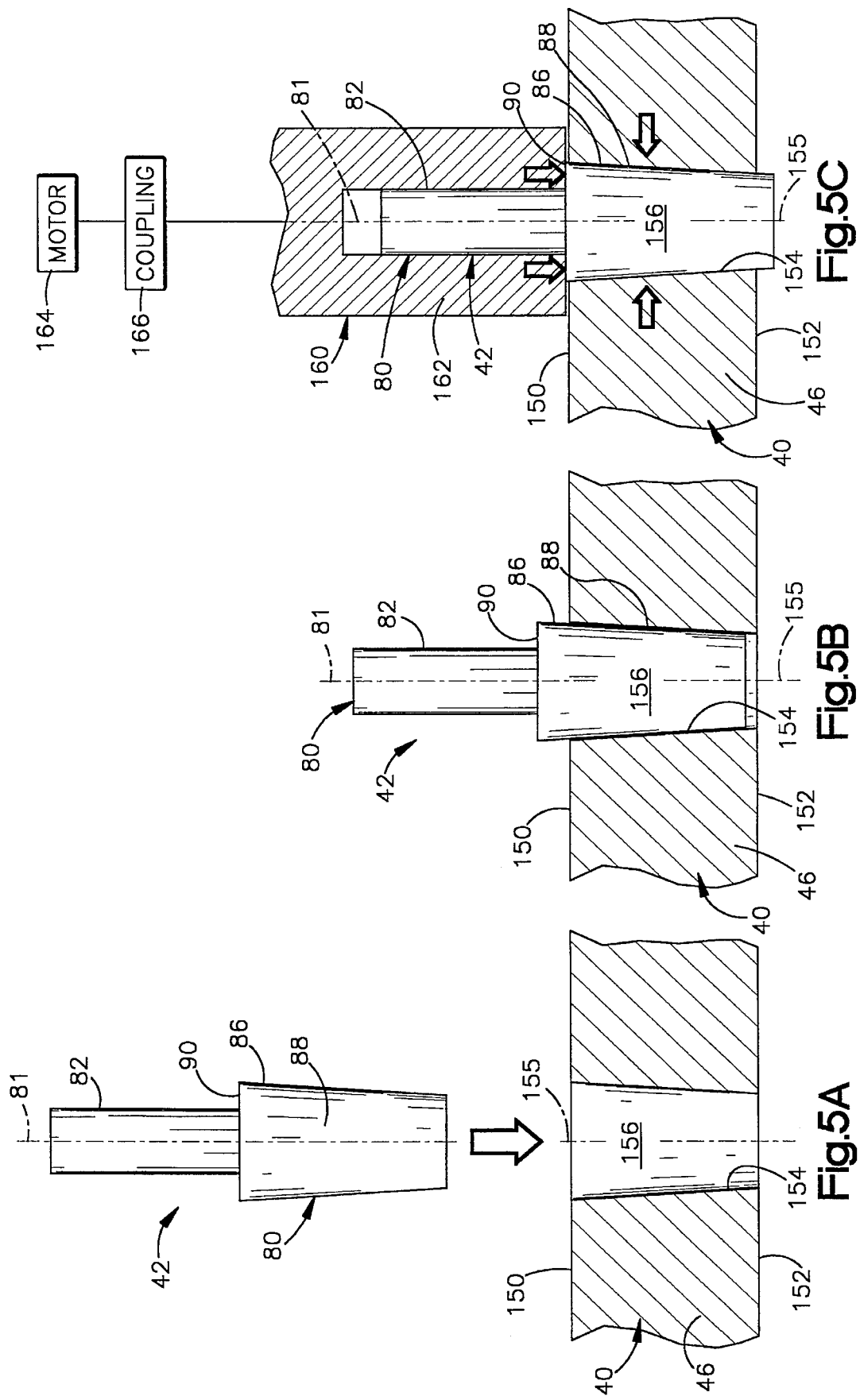

INFLATION FLUID CONTAINER AND INITIATOR WITH PRESS-FIT FLUID SEAL

FIELD OF THE INVENTION

The present invention relates to an inflator for an inflatable vehicle occupant restraint, and particularly relates to an inflator containing inflation fluid under pressure.

BACKGROUND OF THE INVENTION

An inflator for inflating an inflatable vehicle occupant restraint, such as an air bag, may comprise a pressure vessel which stores inflation fluid for inflating the restraint. Such an inflator is disclosed in U.S. Pat. No. 5,348,344. In the inflator disclosed in the '344 patent, the inflation fluid comprises a combustible mixture of gases. The inflator is actuated in response to a vehicle condition which indicates the occurrence of a vehicle collision. When the inflator is actuated, the combustible mixture of gases is ignited. The pressure inside the pressure vessel is then increased by the heat which is generated upon combustion of the combustible mixture of gases. When the increasing pressure reaches a predetermined elevated level, it ruptures a closure wall to open the pressure vessel. The inflation fluid then flows outward from the pressure vessel and into the vehicle occupant restraint.

SUMMARY OF THE INVENTION

In accordance with the present invention, an apparatus for inflating an inflatable vehicle occupant restraint, such as an air bag, comprises container means and initiator means. The container means defines a storage chamber containing inflation fluid under pressure. The initiator means, when actuated, initiates a flow of the inflation fluid from the storage chamber to the restraint.

The container means includes a container wall having a frusto-conical surface. The frusto-conical surface extends through the container wall, and defines a passage extending outward from the storage chamber through the container wall. The initiator means includes an electrically actuatable initiator which extends into the storage chamber through the passage in the container wall. The initiator has a frusto-conical peripheral surface.

The frusto-conical surfaces of the container wall and the initiator are pressed tightly against each other in sealing contact. The frusto-conical surfaces thus comprise sealing means for blocking a flow of the inflation fluid that might otherwise leak outward from the storage chamber through the passage in the container wall.

In a preferred embodiment of the present invention, the inflation fluid contained under pressure in the storage chamber comprises a combustible mixture of gases. The frusto-conical peripheral surface of the initiator is located on a tubular part of the initiator. The tubular part is a casing which contains pyrotechnic material. The casing also contains conductor means for igniting the pyrotechnic material upon the passage of electric current through the conductor means.

When the pyrotechnic material in the casing is ignited, it produces combustion products which rupture the casing and emerge from the initiator. The combustion products are spewed into the storage chamber to ignite the combustible mixture of gases in the storage chamber. This causes the temperature and pressure of the inflation fluid in the storage chamber to increase rapidly to elevated levels. The inflation fluid then applies increasing fluid pressure forces outward against the container means.

When the fluid pressure forces reach a predetermined elevated level, a rupturable closure portion of the container means ruptures so as to provide an outlet opening in the container means. The inflation fluid then exits the storage chamber through the outlet opening to inflate the inflatable vehicle occupant restraint at a high flow rate. The high flow rate results from the elevated pressure level attained by the inflation fluid inside the storage chamber.

BRIEF DESCRIPTION OF THE DRAWINGS

Further features of the present invention will become apparent to those skilled in the art to which the present invention relates from reading the following description with reference to the accompanying drawings, in which:

FIG. 3 is an enlarged partial view of the apparatus of FIG. 1;

FIG. 4 is a view taken on line 4—4 of FIG. 3; and

FIGS. 5A, 5B, and 5C are schematic views indicating a sequence of steps taken in assembly of the apparatus of FIG. 1.

DESCRIPTION OF A PREFERRED EMBODIMENT

Figure 1:
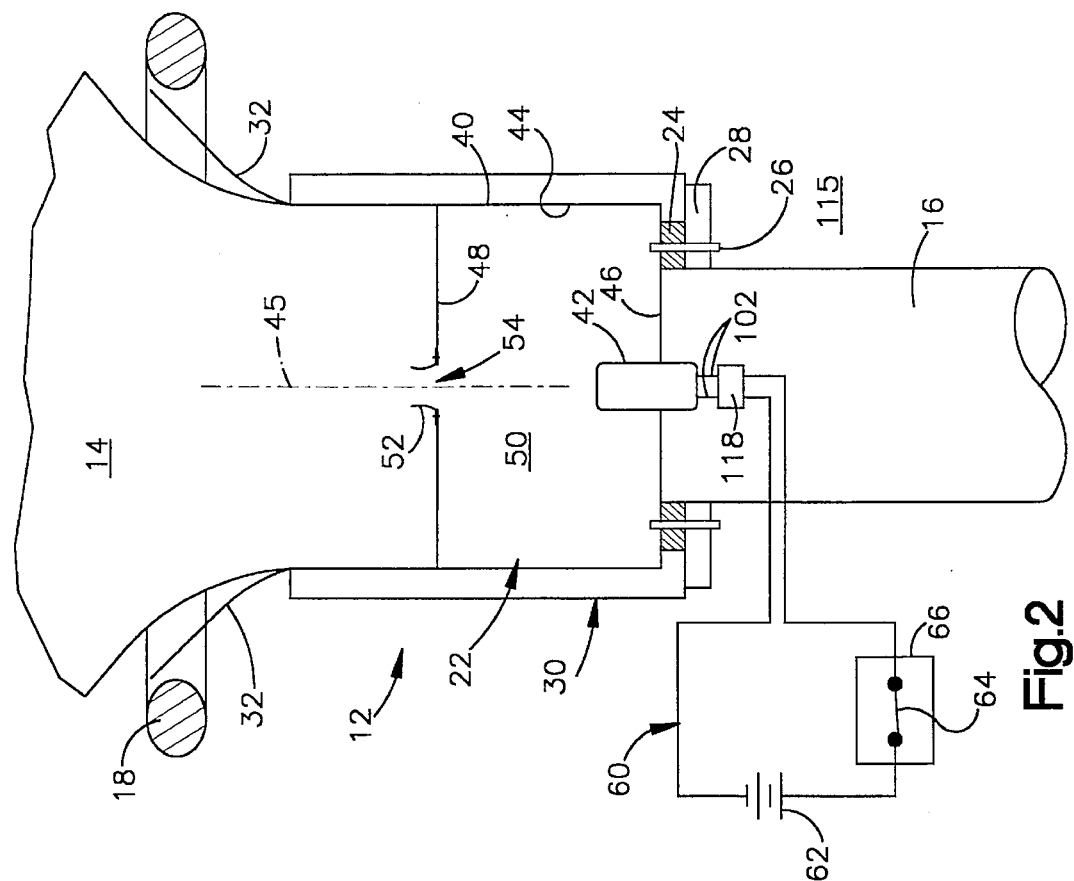
FIG. 1 is a schematic view of a vehicle occupant restraint apparatus comprising a preferred embodiment of the present invention.
Figure 2:
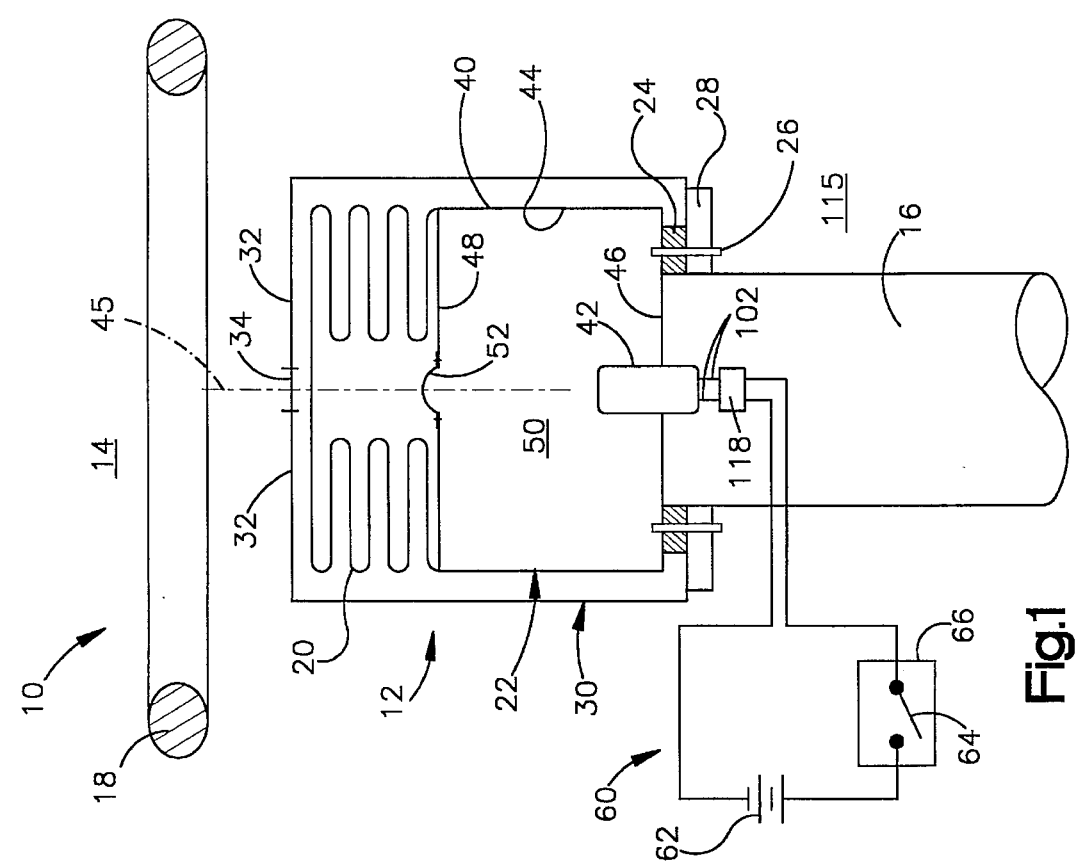
FIG. 2 is a view showing the apparatus of FIG. 1 in an actuated condition.

As shown schematically in FIGS. 1 and 2, a vehicle occupant restraint apparatus 10 comprising a preferred embodiment of the present invention includes an air bag module 12. The air bag module 12 is mounted in a vehicle at a location adjacent to the vehicle occupant compartment 14, such as on the steering column 16 near the center of the steering wheel 18. The air bag module 12 includes a particular type of inflatable vehicle occupant restraint 20 which is commonly referred to as an air bag. The air bag module 12 also includes an inflator 22 which comprises a source of inflation fluid for inflating the air bag 20. Any suitable mounting structure known in the art, such as a retainer ring 24 with fasteners 26, can be used for mounting the air bag module 12 on a corresponding mounting portion 28 of the steering column 16.

When the inflator 22 is actuated, it emits inflation fluid which rapidly inflates the air bag 20 from a folded, uninflated condition, as shown in FIG. 1, to an unfolded, inflated condition, as shown partially in FIG. 2. When the air bag 20 is being inflated, it moves into the vehicle occupant compartment 14 between the steering column 16 and the driver of the vehicle. The air bag 20 then restrains movement of the driver toward the steering column 16 to help protect the driver from a forceful impact with the steering column 16 or other parts of the vehicle.

A deployment assembly 30 encloses the air bag 20 and the inflator 22 on the steering column 16. The deployment assembly 30 is a known structure which includes a pair of deployment door panels 32. The deployment door panels 32 are held in closed positions, as shown in FIG. 1, by a rupturable seam 34. When the inflation fluid emitted from the inflator 22 begins to inflate the air bag 20, it moves the air bag 20 forcefully outward against the deployment assembly 30. The air bag 20 then ruptures the seam 34 and moves the deployment door panels 32 pivotally outward, as shown in FIG. 2. As the inflation fluid continues to inflate the air bag 20, it moves the air bag 20 outward past the deployment door panels 32 and into the vehicle occupant compartment 14.

The inflator 22 in the preferred embodiment of the present invention is a pressure vessel which comprises a container 40 and an initiator 42. The container 40 has a cylindrical side wall 44 with a longitudinal central axis 45. The container 40 further has inner and outer end walls 46 and 48 centered on the axis 45. The walls 44, 46, and 48 of the container 40 together define a cylindrical storage chamber 50 which contains pressurized inflation fluid for inflating the air bag 20. A closure portion 52 of the outer end wall 48 is rupturable in a controlled manner, as shown schematically in FIG. 2, so as to provide an outlet opening 54 through which the inflation fluid can exit the storage chamber 50. As thus far described, the walls 44, 46, and 48 of the container 40, including the closure portion 52 of the outer end wall 48, may have any suitable structure known in the art.

The inflation fluid contained in the storage chamber 50 preferably comprises a combustible mixture of gases in accordance with the invention set forth in U.S. Pat. No. 5,348,344, to Blumenthal, et al., entitled APPARATUS FOR INFLATING A VEHICLE OCCUPANT RESTRAINT USING A MIXTURE OF GASES, and assigned to TRW Vehicle Safety Systems Inc. Accordingly, the inflation fluid comprises a combustible mixture of gases in an unignited, homogeneous gaseous state. The combustible mixture of gases includes a primary gas and a combustible gas. The primary gas comprises the majority of the gas that inflates the air bag 20. The combustible gas, when ignited, heats the primary gas.

The primary gas preferably includes an inert gas for inflating the air bag 20 and an oxidizer gas for supporting combustion of the combustible gas. The primary gas may include air, an inert gas, or a mixture of air and an inert gas. The inert gas may be nitrogen, argon or a mixture of nitrogen and argon. For example, the primary gas may be air, with the oxidizer gas being the oxygen in the air. The combustible gas may be hydrogen, methane, or a mixture of hydrogen and methane. Preferably, the combustible gas is hydrogen. A preferred composition of the mixture of gases is about 12% by volume hydrogen and about 88% by volume air. Although the storage pressure of the inflation fluid may vary, the combustible mixture of gases is preferably contained in the storage chamber 50 at a storage pressure within the range of approximately 1500 psi. to approximately 5000 psi., and is most preferably contained in the storage chamber 50 at a storage pressure of approximately 2500 psi.

The initiator 42 is an electrically actuatable part which, when actuated, initiates a flow of the inflation fluid from the storage chamber 50 to the air bag 20. As shown schematically in FIGS. 1 and 2, the initiator 42 extends partially into the storage chamber 50 through the inner end wall 46 of the container 40. The initiator 42 is included in an electrical circuit 60 which further includes a power source 62 and a normally open switch 64. The power source 62 is preferably the vehicle battery. The switch 64 is part of a sensor 66 which senses a condition indicating the occurrence of a vehicle collision. The collision-indicating condition may comprise, for example, sudden vehicle deceleration caused by a collision. If the collision-indicating condition is above a predetermined threshold level, it indicates the occurrence of a collision for which inflation of the air bag 20 is desired to restrain movement of the driver of the vehicle, as described above. The sensor 66 then closes the switch 64, and the initiator 42 is actuated electrically.

When the initiator 42 is actuated, it ignites the combustible mixture of gases in the storage chamber 50. This causes the temperature and pressure of the gases in the storage chamber 50 to increase rapidly to elevated levels. The gases then apply increasing fluid pressure forces outward against the surrounding walls 44, 46, and 48 of the container 40. This induces stress in the walls 44, 46, and 48 of the container 40. When the stress in the closure portion 52 of the outer end wall 48 reaches a predetermined elevated level, the closure portion 52 ruptures so as to provide the outlet opening 54 (FIG. 2). The container 40 is thus opened upon actuation of the initiator 42. The gases then exit the storage chamber 50 through the outlet opening 54 to inflate the air bag 20 at a high flow rate. The high flow rate results from the elevated pressure level attained by the mixture of gases upon combustion in the storage chamber 50.

As shown in greater detail in FIG. 3, the initiator 42 has an elongated tubular casing 80 which extends through the inner end wall 46 of the container 40 (FIG. 1). Although the casing 80 may be formed of any suitable material known in the art, it is preferably formed of steel, and is most preferably formed of a steel marketed under the trademark KOVAR by CRS Holdings, Inc., of Wilmington, Del.

The casing 80 has a circular cross sectional shape centered on a longitudinal axis 81. A cylindrical section 82 of the casing 80 extends axially along approximately one-half of the length of the casing 80. The cylindrical section 82 has an annular inner end surface 84 defining a circular opening 85 centered on the axis 81.

A tapered section 86 of the casing 80 extends axially from the cylindrical section 82 along the balance of the length of the casing 80. The tapered section 86 of the casing 80 has a frusto-conical shape defined by a frusto-conical peripheral surface 88. The tapered section 86 further has a pair of oppositely facing annular surfaces 90 and 92 at opposite ends of the tapered section 86. The first annular surface 90 of the tapered section 86 is a shoulder surface which lies in a plane perpendicular to the axis 81, and which faces inward along the cylindrical section 82. The second annular surface 92 of the tapered section 86 is an outer end surface located outside the container 40 and defining a circular opening 95 centered on the axis 81.

A cylindrical inner surface 96 of the casing 80 extends axially through both sections 82 and 86 from the inner end surface 84 to the outer end surface 92. The cylindrical inner surface 96 thus defines a cylindrical conduit 98 extending fully through the casing 80 between the circular openings 85 and 95.

The casing 80 contains parts of the initiator 42 which cooperate to ignite the combustible mixture of gases in the storage chamber 50 when the initiator 42 is actuated, as described briefly above. These include a glass seal 100, a pair of electrodes 102, and a bridgewire 104. Such parts of the initiator further include first and second charges 106 and 108 of pyrotechnic material.

The glass seal 100 may be formed of any suitable glass material known in the art, but is preferably formed of a boro-silicate glass, such as either of the boro-silicate glasses marketed by Dow Corning Corporation under the product numbers 7057 and 7070. In the preferred embodiment of the present invention shown in the drawings, the glass seal 100 is shaped as a short cylindrical plug with a cylindrical outer surface 110 and a pair of planar, circular opposite side surfaces 114.

The cylindrical outer surface 110 of the glass seal 100 has a diameter substantially equal to the diameter of the cylindrical inner surface 96 of the casing 80. The glass seal 100 is received closely within the conduit 98, with the cylindrical surfaces 110 and 96 being pressed radially against each other tightly enough to define a hermetic seal. The hermetic seal isolates the charges 106 and 108 of pyrotechnic material from the ambient atmosphere 115 at the outer end of the conduit 98. As shown in FIG. 3, the glass seal 100 is located approximately mid-way along the length of the casing 80, and is contained entirely within the cylindrical section 82 of the casing 80. However, the glass seal 100 could alternatively project into the tapered section 86 of the casing 80, or could be contained entirely within the tapered section 86.

The electrodes 102 are thin metal rods which extend fully through the glass seal 100. The electrodes 102 project a short distance inward from the glass seal 100 toward the opening 85 at the inner end of the casing 80, and project a substantially greater distance outward from the glass seal 100 toward the opening 95 at the outer end of the casing 80. Each electrode 102 has an outer end portion 116 which is accessible through the opening 95 for engagement with an electrical connector 118 (FIG. 1). The electrodes 102 are thus accessible for connection of the initiator 42 in the electrical circuit 60. The electrical connector 118 may have any suitable structure known in the art. Accordingly, the outer end portions 116 of the electrodes 102 may be spaced a short distance inward from the opening 95, as shown in FIG. 3, or may alternatively project a short distance outward through the opening 95, depending upon the structure of the particular electrical connector to be used. In any case, the electrodes 102 are supported by the glass seal 100 so as to extend axially within the conduit 98 in adjacent positions that are spaced fully from the surrounding cylindrical inner surface 96 of the casing 80.

The bridgewire 104 is an electrical conductor which completes a current path through the initiator 42 between the electrodes 102. Such bridgewires also are known in the art, and may be formed of any suitable electrically conductive material.

The first charge 106 of pyrotechnic material is a primer charge. The second charge 108 of pyrotechnic material is a main charge, and is substantially larger than the first charge 106. Preferably, the first charge 106 is approximately 10–35 mg. of $ZrKClO_4$, and the second charge 108 is approximately 75–250 mg. of $BKNO_3$. The two charges 106 and 108 of pyrotechnic material fill an inner portion 119 of the conduit 98 which is located axially between the glass seal 100 and the opening 85.

A circular closure wall 120 abuts the annular inner end surface 84 of the casing 80, and is fixed to the casing 80 by a weld 122. The closure wall 120 and the weld 122 together close the opening 85 to retain the charges 106 and 108 of pyrotechnic material within the inner portion 119 of the conduit 98. The closure wall 120 and the weld 122 also define a hermetic seal for isolating the charges 106 and 108 of pyrotechnic material from the storage chamber 50, and for blocking leakage of the inflation fluid outward from the storage chamber 50 through the opening 85.

When the switch 64 in the electrical circuit 60 is closed, electric current is directed through the initiator 42 to actuate the initiator 42, as described above with reference to FIGS. 1 and 2. Electric current then flows through the bridgewire 104 (FIG. 3) between the electrodes 102. This causes the bridgewire 104 to become resistively heated. The first charge 106 of pyrotechnic material is then ignited by heat emitted from the bridgewire 104. In the preferred embodiment of the present invention, the bridgewire 104 is embedded in the first charge 106 of pyrotechnic material. Alternatively, the bridgewire 104 could merely adjoin the first charge 106, or could have any other suitable heat-transferring relationship with the first charge 106, as long as heat from the bridgewire 104 can ignite the first charge 106. Moreover, the bridgewire 104 in the preferred embodiment of the present invention connects the two electrodes 102 to each other in the conduit 98. An alternative initiator structure could include a bridgewire that connects a single electrode to ground through the casing 80. Such an alternative initiator structure could be arranged as known in the art.

When the first charge 106 of pyrotechnic material in the casing 80 is ignited, it produces and emits combustion products which, in turn, ignite the second charge 108 of pyrotechnic material. The second charge 108 of pyrotechnic material then produces and emits additional combustion products inside the casing 80. The resulting brissance and gas pressure rupture the closure wall 120 and spew the combustion products outward from the casing 80 through the opening 85. The combustion products generated in the casing 80 are thus spewed into the storage chamber 50 to ignite the combustible mixture of gases in the storage chamber 50. This causes the combustible mixture of gases to open the container 40 for inflation of the air bag 20 in the manner described above.

The closure wall 120 is rupturable, as compared with the surrounding inner section 82 of the casing 80, so that the combustion products produced in the casing 80 will not rupture the casing 80, but will instead rupture the closure wall 120 and emerge from the casing 82 through the opening 85. Preferably, this is accomplished by providing the closure wall 120 with a plurality of score lines 140 (FIG. 4). The score lines 140 delineate sections 142 of the closure wall 120 which have the shapes of generally triangular petals. The score lines 140 also weaken the closure wall 120 so as to define stress risers 144 which extend along the score lines 140 between the adjoining sides of the petal-shaped sections 142. The stress risers 144 are designed to rupture under the stress induced by the brissance and the elevated gas pressure produced inside the casing 80. When the stress risers 144 rupture, the petal-shaped sections 142 of the closure wall 120 separate from each other at their adjoining sides and deflect axially inward of the storage chamber 50. Although the closure wall 120 is shown in FIG. 4 to have four score lines 140 extending radially outward from its center, a different pattern of score lines could alternatively be used to define a different number and/or configuration of the petal-shaped sections 142.

In accordance with a principal feature of the present invention, the initiator 42 is engaged with the inner end wall 46 of the container 40 in a manner which provides a hermetic seal between those parts without the use of a weld or other separate sealing structure. The hermetic seal is provided by adjoining surfaces of the initiator 42 and the inner end wall 46 which are pressed tightly against each other.

Specifically, as shown in FIG. 3, the inner end wall 46 of the container 40 has a pair of oppositely facing inner and outer side surfaces 150 and 152. The inner side surface 150 faces inward of the storage chamber 50, and is normally subjected to the pressure of the inflation fluid contained in the storage chamber 50. The outer side surface 152 faces oppositely away from the inner side surface 150, and is normally subjected to the pressure of the ambient atmosphere 115. A frusto-conical surface 154 of the end wall 46 is centered on an axis 155, and extends axially through the end wall 46 fully between the inner and outer side surfaces 150 and 152.

The frusto-conical surface 154 of the end wall 46 is tapered so as to extend radially inward, and axially outward, from the inner side surface 150 to the outer side surface 152. A passage 156 defined by the frusto-conical surface 154 also extends fully through the end wall 46, and likewise has a tapered contour extending radially inward, and axially outward, from the inner side surface 150 to the outer side surface 152. Importantly, the frusto-conical peripheral surface 88 on the tapered section 86 of the casing 80 has a contour which closely matches the contour of the frusto-conical surface 154 on the end wall 46 of the container 40.

The tapered section 86 of the casing 80 is receivable in the passage 156 in the end wall 46 in the installed position in which it is shown in FIG. 3. The frusto-conical surface 88 on the casing 80 then adjoins the frusto-conical surface 154 on the end wall 46 fully throughout the length and circumference of the frusto-conical surface 154 on the end wall 46. The adjoining frusto-conical surfaces 88 and 154 are pressed against each other tightly enough to establish a seal which blocks a flow of gas that might otherwise leak outward from the storage chamber 50 through the passage 156 between the casing 80 and the end wall 46.

A method of installing the initiator 42 in the installed position of FIG. 3 is shown schematically by way of example in FIGS. 5A–5C. As indicated in FIGS. 5A and 5B, the casing 80 is first moved axially into the passage 156 in the end wall 46 until the frusto-conical surfaces 88 and 154 initially adjoin each other in relatively loose, mating contact as a result of their complementary tapered contours. As indicated in FIG. 5C, a suitable driving tool, such as a shaft 160 with a socket head 162, is then used to apply a driving force axially against the shoulder surface 90 on the tapered section 88 of the casing 80. The driving force is transmitted to the shaft 160 from a pneumatic or hydraulic motor 164 by a suitable coupling 166, as further shown schematically in FIG. 5C. This advances the tapered section 86 of the casing 80 a short distance axially outward through the passage 156 in the end wall 46. As a result, the adjoining frusto-conical surfaces 88 and 154 become pressed tightly against each other to establish a seal.

More specifically, the tapered section 88 of the casing 80 becomes radially compressed, and is maintained under radially compressive loading, as indicated by the horizontal arrows shown in FIG. 5C. Such compressive loading maintains the sealing effect provided by the adjoining frusto-conical surfaces 88 and 154. Additionally, the inflation fluid in the storage chamber 50 continuously applies fluid pressure forces axially outward against the casing 80 at the closure wall 120 and the shoulder surface 90. As a result of their complementary tapered contours, the adjoining frusto-conical surfaces 88 and 154 are continuously urged into tighter sealing contact with each other under the influence of such axially directed fluid pressure forces.

The glass seal 100 is preferably contained entirely within the cylindrical section 82 of the casing 80, as noted above. In accordance with this feature of the present invention, the glass seal 100 is spaced axially from the radially compressed portion of the tapered section 86 which is located in the passage 156. This helps to protect the glass seal 100 from being broken by the compressive load applied to the casing 80 when the casing 80 is installed in the end wall 46 in the foregoing manner.

From the above description of the invention, those skilled in the art will perceive improvements, changes and modifications. Such improvements, changes and modifications within the skill of the art are intended to be covered by the appended claims.

Having described the invention, the following is claimed:

1. Apparatus for inflating an inflatable vehicle occupant restraint, said apparatus comprising:

container means for defining a storage chamber, said container means including a container wall having a frusto-conical surface defining a passage extending outward from said storage chamber through said container wall;

inflation fluid contained under pressure in said storage chamber; and initiator means for initiating a flow of said inflation fluid from said storage chamber to the restraint to inflate the restraint, said initiator means including pyrotechnic material and conductor means for igniting said pyrotechnic material upon the passage of electric current through said conductor means;

said initiator means further including a tubular part containing said pyrotechnic material and said conductor means, said tubular part extending into said storage chamber through said passage in said container wall and having a frusto-conical peripheral surface;

said frusto-conical surfaces having a condition of being pressed tightly against each other in sealing contact so as to comprise first sealing means for blocking said inflation fluid from exiting said storage chamber through said passage between said tubular part and said container wall;

said tubular part defining a conduit extending along an axis, said conduit containing a glass part which comprises second sealing means for isolating said pyrotechnic material from the ambient atmosphere, said first sealing means applying a radially compressive sealing force to said tubular part, said glass part being spaced from said first sealing means along said axis.

2. Apparatus as defined in claim 1 wherein said tubular part has an outer portion located in said passage and has an inner portion projecting from said outer portion into said storage chamber, said first sealing means applying said radially compressive sealing force directly to said outer portion of said tubular part, said glass part being contained in said inner portion of said tubular part.

3. Apparatus for inflating an inflatable vehicle occupant restraint, said apparatus comprising:

container means for defining a storage chamber, said container means including a container wall having a frusto-conical surface defining a passage extending outward from said storage chamber through said container wall;

inflation fluid contained under pressure in said storage chamber;

initiator means for initiating a flow of said inflation fluid from said storage chamber to the restraint to inflate the restraint, said initiator means including a tubular part extending into said storage chamber through said passage in said container wall, said tubular part having a frusto-conical peripheral surface; and sealing means for blocking said inflation fluid from leaking outward from said container means through said passage between said tubular part and said container wall, said sealing means consisting of adjoining portions of said frusto-conical surfaces which engage each other in a press fit tightly enough to block said inflation fluid from leaking outward from said container means between said adjoining portions of said frusto-conical surfaces.

4. Apparatus as defined in claim 3 wherein said container wall further has an inner side surface subjected to said pressure of said inflation fluid and an oppositely facing outer side surface subjected to ambient atmospheric pressure, said frusto-conical surfaces being tapered to extend radially inward and axially outward from said inner side surface toward said outer side surface, whereby said pressure of said inflation fluid urges said frusto-conical surface of said tubular part axially outward against said frusto-conical surface of said container wall.

5. Apparatus as defined in claim 4 wherein said tubular part further has a cylindrical inner surface and contains a glass seal with a cylindrical outer surface adjoining said cylindrical inner surface, said glass seal being spaced axially from said first sealing means.

6. Apparatus as defined in claim 4 wherein said frusto-conical surface of said container wall has a length extending fully between said inner and outer side surfaces, said press fit extending fully along said length.

7. Apparatus as defined in claim 4 wherein said tubular part further has an annular shoulder surface facing inward of said storage chamber, said shoulder surface comprising means for receiving an axially directed driving force which moves said tubular part through said passage in a direction extending axially outward from said inner side surface toward said outer side surface so as to press said frusto-conical surfaces forcefully together upon placement of said frusto-conical surfaces in said press fit.

8. Apparatus as defined in claim 3 wherein said container means is free of a weld interconnecting said tubular part and said container wall.

9. Apparatus for inflating an inflatable vehicle occupant restraint, said apparatus comprising:

container means for defining a storage chamber, said container means including a container wall having a frusto-conical surface defining a passage extending outward from said storage chamber through said container wall;

inflation fluid contained under pressure in said storage chamber; and initiator means for initiating a flow of said inflation fluid from said storage chamber to the restraint to inflate the restraint, said initiator means including a tubular part extending into said storage chamber through said passage in said container wall, said tubular part having a frusto-conical peripheral surface;

said frusto-conical surfaces engaging each other in a press fit tightly enough to comprise sealing means for blocking said inflation fluid from leaking outward from said container means through said passage between said tubular part and said container wall;

said container wall further having an inner side surface subjected to said pressure of said inflation fluid and an oppositely facing outer side surface subjected to ambient atmospheric pressure, said frusto-conical surfaces being tapered to extend radially inward and axially outward from said inner side surface toward said outer side surface, whereby said pressure of said inflation fluid urges said frusto-conical surface of said tubular part axially outward against said frusto-conical surface of said container wall.

10. Apparatus as defined in claim 9 wherein said tubular part further has a cylindrical inner surface and contains a glass seal with a cylindrical outer surface adjoining said cylindrical inner surface, said initiator means further including a pair of electrodes extending through said glass seal.

11. Apparatus as defined in claim 9 wherein said frusto-conical surface of said container wall has a length extending fully between said inner and outer side surfaces, said press fit extending fully along said length.

12. Apparatus as defined in claim 9 wherein said tubular part further has an annular shoulder surface facing inward of said storage chamber, said shoulder surface comprising means for receiving an axially directed driving force which moves said tubular part through said passage in a direction extending axially outward from said inner side surface toward said outer side surface so as to press said frusto-conical surfaces forcefully together upon placement of said frusto-conical surfaces in said press fit.

13. Apparatus for inflating an inflatable vehicle occupant restraint, said apparatus comprising:

container means for defining a storage chamber, said container means including a container wall having a frusto-conical surface defining a passage extending outward from said storage chamber through said container wall;

inflation fluid contained under pressure in said storage chamber; and initiator means for initiating a flow of said inflation fluid from said storage chamber to the restraint to inflate the restraint, said initiator means including a tubular part extending into said storage chamber through said passage in said container wall, said tubular part having a frusto-conical peripheral surface;

said frusto-conical surfaces engaging each other in a press fit tightly enough to comprise sealing means for blocking said inflation fluid from leaking outward from said container means through said passage between said tubular part and said container wall;

said container means being free of a weld interconnecting said tubular part and said container wall.

* * * * *

UNITED STATES PATENT AND TRADEMARK OFFICE
CERTIFICATE OF CORRECTION

PATENT NO. : 5,609,361
DATED : March 11, 1997
INVENTOR(S) : Lee D. Bergerson and Ivan L. Stonich It is certified that error appears in the above-indentified patent and that said Letters Patent is hereby corrected as shown below:

Column 8, line 36, change "a radially" to --an axially--.

Column 8, line 43, change "radially" to --axially--.

Signed and Sealed this

First Day of July, 1997

*Attest:*

*Attesting Officer*

BRUCE LEHMAN
*Commissioner of Patents and Trademarks*